(12) United States Patent
Skinkle et al.

(10) Patent No.: US 10,077,996 B2
(45) Date of Patent: Sep. 18, 2018

(54) FLOWMETER HOUSING AND RELATED METHODS

(71) Applicant: Micro Motion, Inc., Boulder, CO (US)

(72) Inventors: David Skinkle, Boulder, CO (US); Anthony William Pankratz, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 16 days.

(21) Appl. No.: 15/508,375

(22) PCT Filed: Sep. 25, 2014

(86) PCT No.: PCT/US2014/057446
§ 371 (c)(1),
(2) Date: Mar. 2, 2017

(87) PCT Pub. No.: WO2016/048324
PCT Pub. Date: Mar. 31, 2016

(65) Prior Publication Data
US 2017/0248457 A1    Aug. 31, 2017

(51) Int. Cl.
*G01F 1/84*     (2006.01)
*G01F 15/14*    (2006.01)

(52) U.S. Cl.
CPC .......... *G01F 1/8418* (2013.01); *G01F 1/8472* (2013.01); *G01F 15/14* (2013.01)

(58) Field of Classification Search
CPC .................................. G01F 1/84; G01F 15/14
See application file for complete search history.

(56) References Cited

U.S. PATENT DOCUMENTS

| | | | | |
|---|---|---|---|---|
| 7,628,083 B2* | 12/2009 | Lanham | ............... | G01F 1/8409 |
| | | | | 73/861.355 |
| 8,215,185 B2* | 7/2012 | Griffin | ................. | G01F 1/8409 |
| | | | | 73/861.357 |
| 8,381,600 B2* | 2/2013 | Huber | ...................... | G01F 1/74 |
| | | | | 73/861.357 |
| 8,596,142 B2* | 12/2013 | Huber | .................. | G01F 1/8427 |
| | | | | 73/861.357 |
| 8,863,589 B2* | 10/2014 | Bitto | .................... | G01F 1/8477 |
| | | | | 73/861.355 |

(Continued)

FOREIGN PATENT DOCUMENTS

| DE | 102007048881 A1 | 4/2009 |
|---|---|---|
| WO | 2012005735 A1 | 1/2012 |

*Primary Examiner* — Jewel V Dowtin
(74) *Attorney, Agent, or Firm* — The Ollila Law Group LLC (57) ABSTRACT

A flowmeter having one or more conduits (103, 103') and a driver (104) coupled to one or more conduits (103, 103') being configured to vibrate at least a portion of the conduit at one or more drive frequencies. One or more pickoffs (105, 105') are coupled to the one or more conduits (103, 103') and are configured to detect a motion of the conduit. A housing (200) has a first compartment (400) and a second compartment (402). The first compartment (400) is fluid-tight and encloses at least a portion of the one or more conduits (103, 103'), the driver (104), and the one or more pickoffs (105, 105'). A sealable fill port (418) is configured to allow the addition of a ballast material to the second compartment (402).

40 Claims, 6 Drawing Sheets

(56) References Cited

U.S. PATENT DOCUMENTS

| | | | | |
|---|---|---|---|---|
| 8,924,165 B2* | 12/2014 | Kumar | ............. | G01F 1/8413 |
| | | | | 702/47 |
| 8,931,346 B2* | 1/2015 | Rieder | ............. | G01F 1/8413 |
| | | | | 73/658 |
| 9,377,387 B2* | 6/2016 | Dijk | ............. | G01N 9/002 |
| 9,897,473 B2* | 2/2018 | Braun | ............. | G01F 1/8431 |

* cited by examiner

FLOWMETER HOUSING AND RELATED METHODS

TECHNICAL FIELD

The present invention relates to flowmeters, and more particularly to a flowmeter housing having improved pressure containment and related methods.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a flowmeter can be initially calibrated and a flow calibration factor along with a zero offset can be generated. In use, the flow calibration factor can be multiplied by the time delay measured by the pickoffs minus the zero offset to generate a mass flow rate. In most situations, the flowmeter is initially calibrated, typically by the manufacturer, and assumed to provide accurate measurements without subsequent calibrations required. In addition, a prior art approach involves a user zero-calibrating the flowmeter after installation by stopping flow, closing valves, and therefore providing the meter a zero flow rate reference at process conditions.

Vibrating sensors, including Coriolis flowmeters, are often employed in applications that subject the sensors to relatively high process fluid pressures. High pressures increase the risk of a conduit rupture. When this occurs, process fluid escapes the wetted portion of the assembly (e.g. conduits) and enters non-wetted portions such as the housing. Typically, the housing provides only around 20% of the pressure rating of the wetted portions, as construction typically involves relatively thin sheet metal. High pressure process fluids are therefore easily capable of breaching the housing. Besides the costs incurred in halting processes, cleanup, and product loss, certain process fluids are hazardous, be it from acidity, flammability, temperature, toxicity, etc. Therefore, there is a need for a sensor housing that is capable of containing high pressure loads.

Additionally, the housing may play a role in controlling modal frequencies away from the driven mode. This may be accomplished by employing large, stiff, and heavy housing structures. This is typically accomplished by welding heavy weights to the housing. Unfortunately, this results in a device that is exceedingly heavy and expensive to transport. There is therefore a need for a flowmeter housing with parameters (mass, stiffness, damping) that can be controlled before or after manufacturing and/or shipment.

The present invention overcomes these and other problems and an advance in the art is achieved.

SUMMARY OF THE INVENTION

A flowmeter is provided according to an embodiment. According to the embodiment, the flowmeter comprises one or more conduits. A driver is coupled to a conduit of the one or more conduits and is configured to vibrate at least a portion of the conduit at one or more drive frequencies. One or more pickoffs are coupled to a conduit of the one or more conduits and configured to detect a motion of the conduit. A housing has a first compartment and a second compartment, wherein the first compartment is configurable to be fluid-tight and enclose at least a portion of the one or more conduits, the driver, and the one or more pickoffs. A sealable fill port is configured to allow the addition of a ballast material to the second compartment.

A method of forming a flowmeter including one or more conduits is provided according to an embodiment. The embodiment comprises the steps of: enclosing at least a portion of the one or more conduits in a first compartment of a housing comprising a first compartment and a second compartment, wherein the first compartment is fluid-tight; and providing a sealable fill port configured to allow the addition of a ballast material to the second compartment.

A housing is provided according to an embodiment. According to the embodiment, the housing comprises a first compartment and a second compartment, wherein the first compartment is configured to be fluid-tight and is configured to enclose at least a portion of a sensor assembly. A sealable fill port is configured to allow the addition of a ballast material to the second compartment.

A method of forming a housing is provided according to an embodiment. The embodiment comprises the steps of: providing a first compartment and a second compartment, wherein the first compartment is configured to encase at least a portion of a sensor assembly and is fluid-tight; and providing a sealable fill port configured to allow the addition of a ballast material to the second compartment.

Aspects

According to an aspect, a flowmeter is provided. The aspect comprises: one or more conduits; a driver coupled to a conduit of the one or more conduits and configured to vibrate at least a portion of the conduit at one or more drive frequencies; one or more pickoffs coupled to a conduit of the one or more conduits and configured to detect a motion of the conduit; a housing having a first compartment and a second compartment, wherein the first compartment is configurable to be fluid-tight and to enclose at least a portion of the one or more conduits, the driver, and the one or more pickoffs; and a sealable fill port configured to allow the addition of a ballast material to the second compartment.

Preferably, the flowmeter comprises one or more walls in the second compartment defining at least two voids in the second compartment.

Preferably, the one or more walls are coupled to the housing and to a base that defines at least a portion of the second compartment.

Preferably, the second compartment comprises a cover plate configured to seal at least one void in the housing.

Preferably, the cover plate defines the sealable fill port.

Preferably, the cover plate is welded to the housing.

Preferably, the flowmeter comprises one or more manifolds coupled to the one or more conduits and one or more manifold openings formed in the first compartment that are adapted to receive the one or more manifolds, wherein the one or more manifolds are sealedly joined to the one or more manifold openings.

Preferably, a first wall of the one or more walls is thicker than a second wall of the one or more walls.

Preferably, at least one void contains a ballast material.

Preferably, the flowmeter comprises an access opening configured to permit assembly of the flowmeter and a cover configured to seal the access opening.

According to an aspect, a method of forming a flowmeter including one or more conduits is provided. The aspect comprises the steps of: enclosing at least a portion of the one or more conduits in a first compartment of a housing comprising a first compartment and a second compartment, wherein the first compartment is fluid-tight; and providing a sealable fill port configured to allow the addition of a ballast material to the second compartment.

Preferably, the method comprises providing one or more walls within the second compartment to define at least two voids in the second compartment.

Preferably, the method comprises the step of sealing at least one void with a cover plate.

Preferably, the method comprises the step of providing a ballast material in at least one void.

Preferably, the first compartment comprises a pressure rating equal to or greater than a pressure rating of the one or more conduits.

Preferably, the first compartment comprises a pressure rating that is a predetermined percentage of the pressure rating of the one or more conduits.

Preferably, the method comprises the steps of: coupling one or more manifolds to the one or more conduits; forming one or more manifold openings in the first compartment, wherein the one or more manifold openings are adapted to receive the one or more manifolds; and sealedly joining the one or more manifolds to the one or more manifold openings.

Preferably, a first wall of the one or more walls is thicker than a second wall of the one or more walls.

Preferably, the method comprises the step of orienting at least one of the one or more walls in the housing so that modal frequencies of the housing differ from a driven modal frequency by a predetermined threshold.

Preferably, the method comprises the step of providing an access opening in the first compartment to permit assembly of the flowmeter.

According to an aspect, a housing is provided. The housing comprises: a first compartment and a second compartment, wherein the first compartment is configured to be fluid-tight and configured to enclose at least a portion of a sensor assembly; and a sealable fill port configured to allow the addition of a ballast material to the second compartment.

Preferably, one or more walls in the second compartment define at least two voids in the second compartment.

Preferably, the one or more walls are coupled to the housing and to a base that defines at least a portion of the second compartment.

Preferably, the second compartment comprises a cover plate configured to seal at least one void in the housing.

Preferably, the cover plate defines the sealable fill port.

Preferably, the cover plate is welded to the housing.

Preferably, the housing is configured to sealedly couple one or more manifolds to one or more manifold openings formed in the first compartment.

Preferably, a first wall of the one or more walls is thicker than a second wall of the one or more walls.

Preferably, at least one void contains a ballast material.

Preferably, the housing comprises an access opening and a cover configured to seal the access opening.

According to an aspect, a method of forming a housing is provided. The method comprises the steps of providing a first compartment and a second compartment in the housing, wherein the first compartment is configured to encase at least a portion of a sensor assembly and is fluid-tight; and providing a sealable fill port configured to allow the addition of a ballast material to the second compartment.

Preferably, the method comprises the step of providing one or more walls within the second compartment to define at least two voids in the second compartment.

Preferably, the method comprises the step of sealing at least one void with a cover plate.

Preferably, the method comprises the step of providing a ballast material in at least one void.

Preferably, the first compartment comprises a pressure rating equal to or greater than a pressure rating of a conduit of the sensor assembly.

Preferably, the first compartment comprises a pressure rating that is a predetermined percentage of a pressure rating of a conduit of the sensor assembly.

Preferably, the method comprises the step of forming one or more manifold openings in the first compartment, wherein the one or more manifold openings are adapted to receive and sealedly join the first compartment to one or more manifolds. Preferably, a first wall of the one or more walls is thicker than a second wall of the one or more walls.

Preferably, the method comprises the step of providing at least one of the one or more walls in the housing so that modal frequencies of the housing differ from a driven modal frequency by a predetermined threshold.

Preferably, the method comprises the step of providing an access opening in the first compartment.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
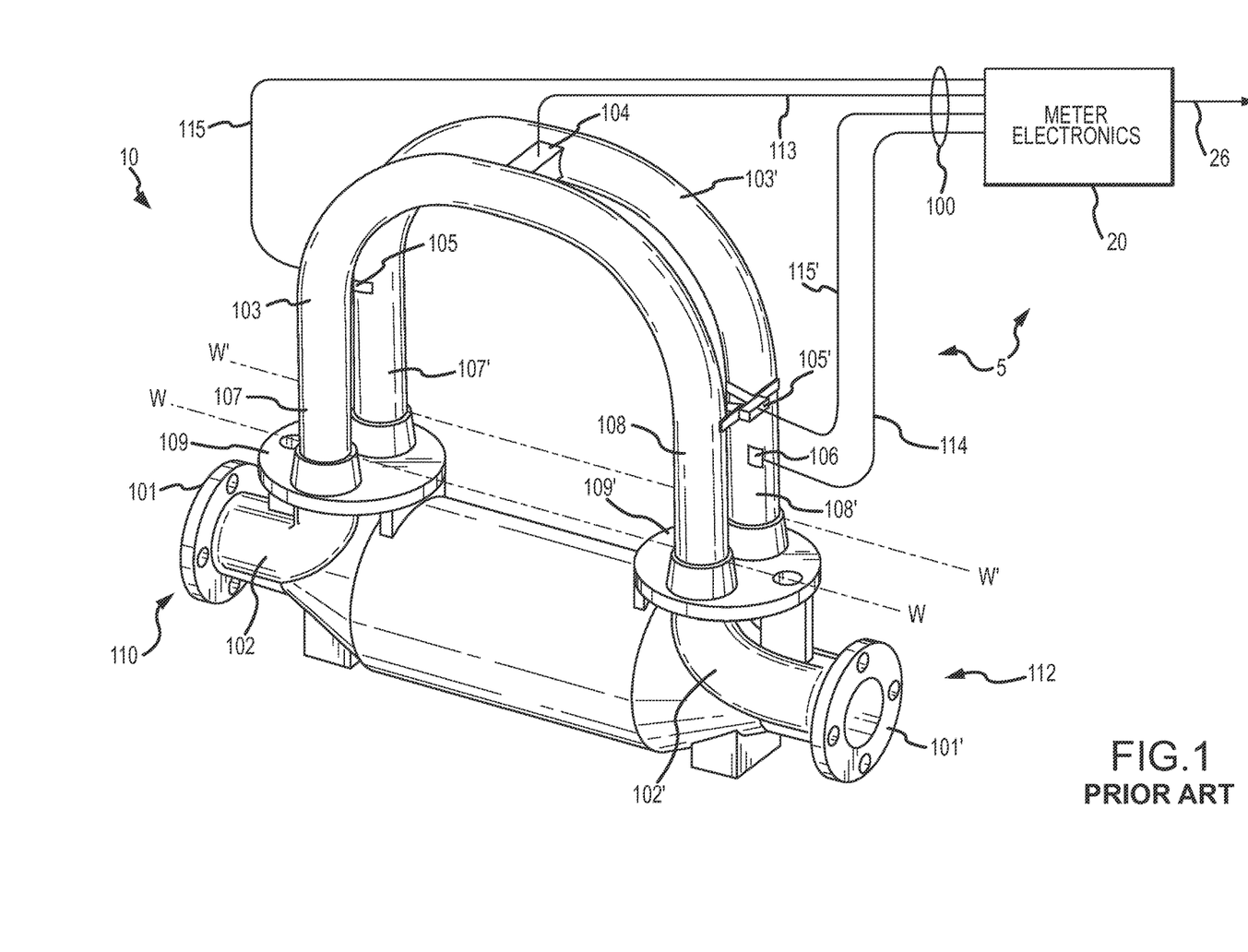
FIG. 1 illustrates a prior art sensor assembly.

FIG. 1 illustrates a prior art flowmeter 5, which can be any vibrating meter, such as a Coriolis flowmeter or densitometer, for example without limitation. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. The sensor assembly 10 includes flanges 101 and 101', a pair of manifolds 102 and 102', a pair of parallel conduits 103 (first conduit) and 103' (second conduit), a driver 104, a temperature sensor 106 such as a resistive temperature detector (RTD), and a pair of pickoffs 105 and 105' such as magnet/coil pickoffs, strain gages, optical sensors, or any other pickoff known in the art. The conduits 103 and 103' have inlet legs 107 and 107' and outlet legs 108 and 108', respectively. Conduits 103 and 103' bend at least one symmetrical location along their length and are essentially parallel throughout their length. Each conduit 103, 103' oscillates about axes W and W', respectively.

The legs 107, 107', 108, 108' of conduits 103,103' are fixedly attached to conduit mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101 and is conducted through the manifold 102 to conduit mounting block 109. Within the manifold 102, the material is divided and routed through conduits 103 and 103'. Upon exiting conduits 103 and 103', the process material is recombined in a single stream within manifold 102' and is thereafter routed to exit a second end 112 connected by flange 101' to the process line (not shown).

Conduits 103 and 103' are selected and appropriately mounted to the conduit mounting blocks 109 and 109' so as to have substantially the same mass distribution, moments of inertia, and Young's modulus about bending axes W-W and W'-W', respectively. Inasmuch as the Young's modulus of the conduits 103, 103' changes with temperature, and this change affects the calculation of flow and density, a temperature sensor 106 is mounted to a conduit 103, 103' to continuously measure the temperature of the conduit. The temperature of the conduit, and hence the voltage appearing across the temperature sensor 106 for a given current passing therethrough, is governed primarily by the temperature of the material passing through the conduit. The temperature-dependent voltage appearing across the temperature sensor 106 is used in a well-known method by meter electronics 20 to compensate for the change in elastic modulus of conduits 103, 103' due to any changes in conduit 103, 103' temperature. The temperature sensor 106 is connected to meter electronics 20.

Both conduits 103, 103' are driven by driver 104 in opposite directions about their respective bending axes W and W' at what is termed the first out-of-phase bending mode of the flowmeter. This driver 104 may comprise any one of many well-known arrangements, such as a magnet mounted to conduit 103' and an opposing coil mounted to conduit 103, through which an alternating current is passed for vibrating both conduits. A suitable drive signal is applied by meter electronics 20, via lead 113, to the driver 104. It should be appreciated that while the discussion is directed towards two conduits 103, 103', in other embodiments, only a single conduit may be provided or more than two conduits may be provided. It is also within the scope of the present invention to produce multiple drive signals for multiple drivers.

Meter electronics 20 receive the temperature signal on lead 114, and the left and right velocity signals appearing on leads 115 and 115', respectively. Meter electronics 20 produce the drive signal appearing on lead 113 to driver 104 and vibrate conduits 103, 103'. Meter electronics 20 process the left and right velocity signals and the temperature signal to compute the mass flow rate and the density of the material passing through sensor assembly 10. This information, along with other information, is applied by meter electronics 20 over path 26 to utilization means. An explanation of the circuitry of the meter electronics 20 is not needed to understand the present invention and is omitted for brevity of this description. It should be appreciated that the description of FIG. 1 is provided merely as an example of the operation of one possible vibrating meter and is not intended to limit the teaching of the present invention.

A Coriolis flowmeter structure is described although it will be apparent to those skilled in the art that the present invention could be practiced on a vibrating tube densitometer without the additional measurement capability provided by a Coriolis mass flowmeter. In fact, the present invention may be utilized in pipelines, conduits, flanges, of all sizes, with or without means for measuring mass flow, density, etc. The present invention may be practiced in the absence of any flowmeter 5 as well.

Figure 2:
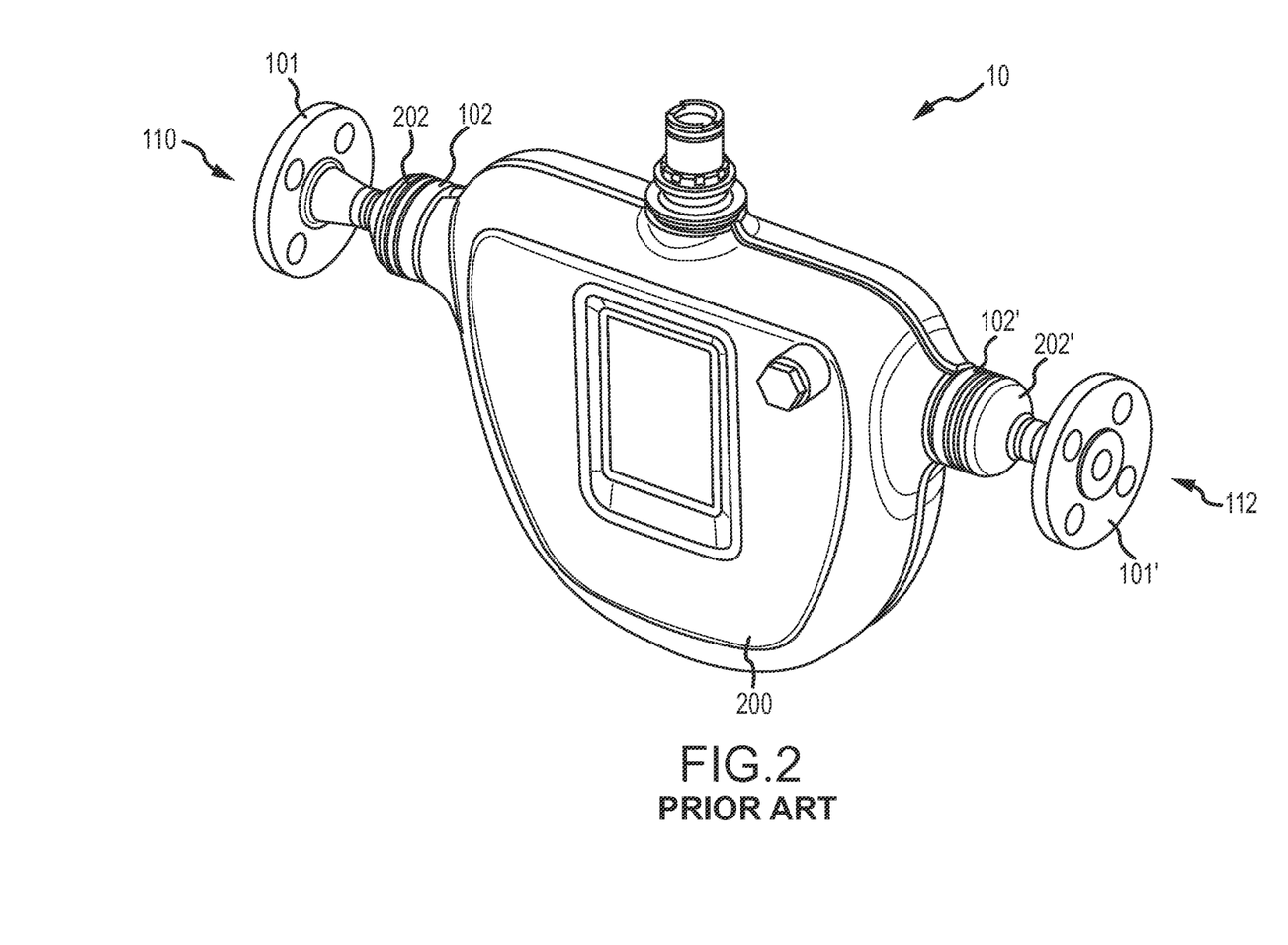
FIG. 2 illustrates a prior art sensor assembly having a housing.

FIG. 2 illustrates an embodiment of a prior art sensor assembly 10 that is encased by a housing 200. Much of the sensor assembly 10 is hidden from view by the housing 200, but the manifolds 102, 102' and flanges 101, 101' are visible. In this embodiment, adapters 202, 202' are welded to connect the flanges 101, 101' to their respective manifolds 102, 102'. A process line (not shown) would be connected to the flanges 101, 101' for typical use.

Figure 3:
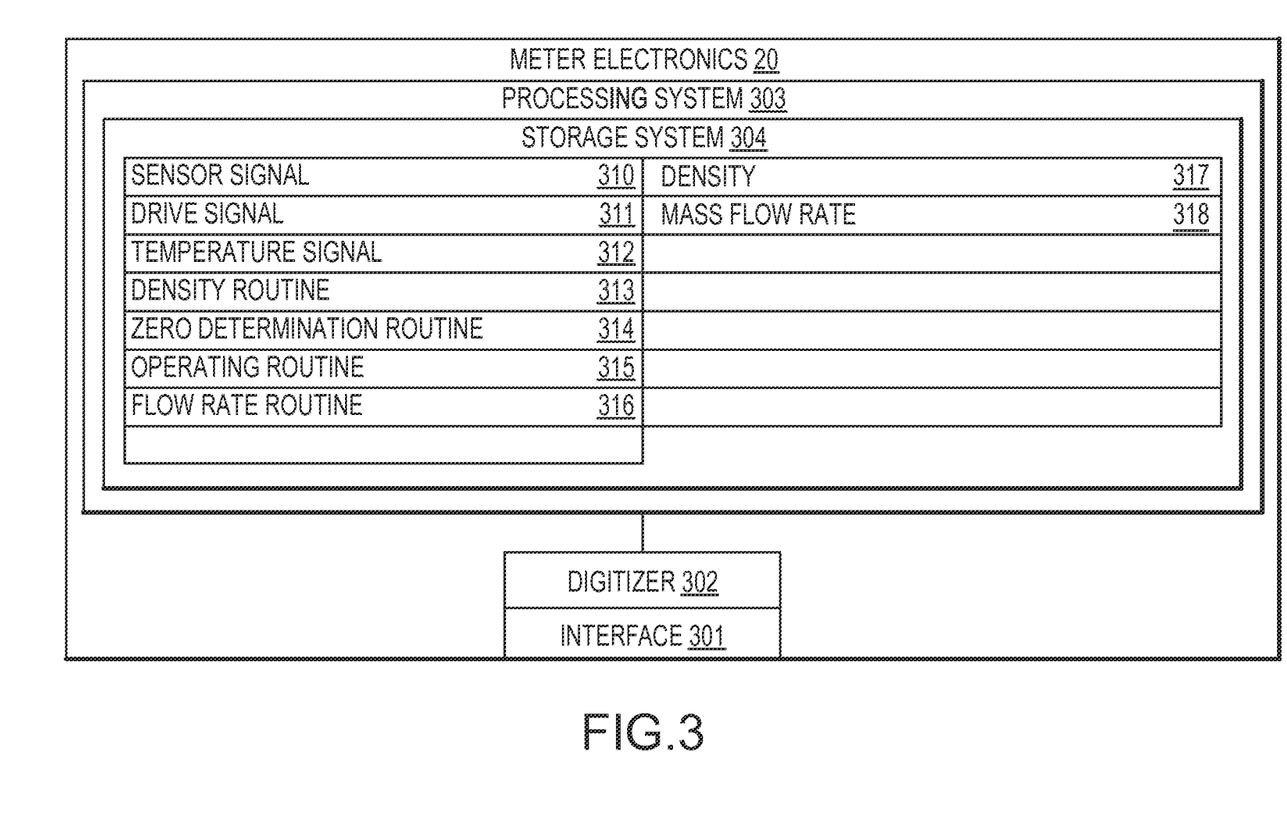
FIG. 3 illustrates prior art meter electronics.

FIG. 3 illustrates meter electronics 20. The meter electronics 20 may include an interface 301 and a processing system 303. The processing system 303 may include a storage system 304. The storage system 304 may comprise an internal memory, and/or may comprise an external memory. The meter electronics 20 can generate a drive signal 311 and supply the drive signal 311 to the driver 104. In addition, the meter electronics 20 can receive sensor signals 310 from the flowmeter 5, such as pickoff/velocity sensor signals, strain signals, optical signals, temperature signals, or any other signals known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103, 103'. In some embodiments, the meter electronics 20 may receive a temperature signal 312 from one or more RTD sensors or other temperature sensors 106, for example.

The interface 301 can receive the sensor signals 310 from the driver 104 or pickoffs 105, 105', via leads 113, 115, 115', respectively. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a density routine 313, a zero determination routine 314, a general operating routine 315, and a flow rate routine 316, for example without limitation. According to an embodiment, the meter electronics 20 can also measure a temperature signal 312, and associate that temperature with the flow rates captured at a given temperature.

The flowmeter 5 may generate a density 317. A mass flow rate 318 or the density 317 may be calculated, for example, as part of the operating routine 315. In an embodiment, the temperature signal 312 is read and a zero-flow rate is also saved and calculated as part of the zero determination routine 314. A calibrated meter zero improves calculation accuracy.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as the storage system 304.

The processing system 303 processes the sensor signal 310 in order to generate the drive signal 311, among other things. The drive signal 311 is supplied to the driver 104 in order to vibrate the associated conduit(s), such as the conduits 103, 103' of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

Figure 4:
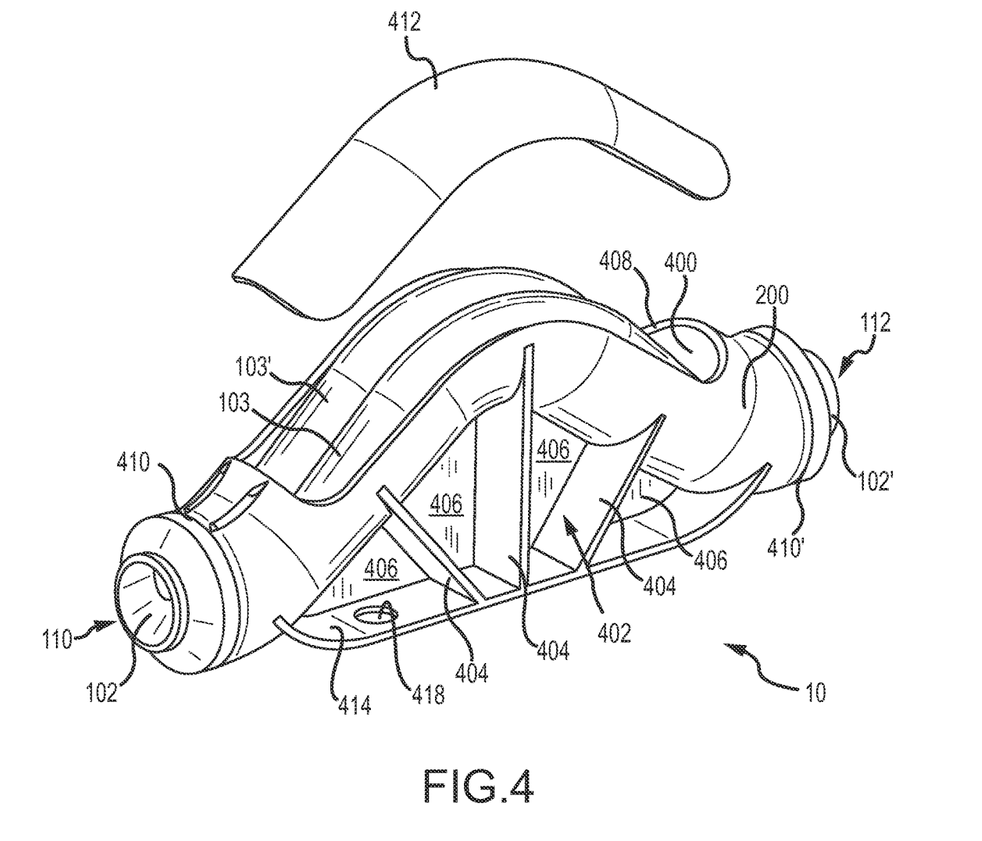
FIG. 4 illustrates a sensor assembly according to an embodiment.

FIG. 4 illustrates a sensor assembly 10 according to an embodiment. Much of the sensor assembly 10 is hidden from view by the housing 200, but the conduits 103, 103' and manifolds 102, 102' are visible in this view. The housing 200 is divided into two main compartments, the first compartment 400 and second compartment 402. The housing 200 may be provided in two or more portions and glued, snap-fit, welded, brazed or otherwise coupled once in place. The housing 200 may be cast, machined, or cast and machined. The first compartment is fluid tight, and generally follows the contours of the conduits 103, 103'. Thus, the shape of the first compartment 400 is not limited to the bent orientation illustrated, as conduits 103, 103' may be straight, omega-shaped, U-shaped, or other shapes well known in the art. The driver 104, one or more pickoffs 105, 105', temperature sensor 106, strain gages (not shown), or any other sensor associated with the conduits 103, 103' may also be housed in the first compartment 400. Meter electronics 20 may be housed in the first compartment 400, second compartment 402, or outside both of these compartments. In one embodiment, the volume of the first compartment 400 is minimized to allow for an increased pressure rating. In an embodiment, a temperature sensor 106 is placed on the housing 200. In a related embodiment, temperature sensor(s) 106 are placed in the first compartment 400 and/or the second compartment 402. Temperature measurements from the first compartment 400 and/or the second compartment 402 may be utilized by meter electronics 20 to compensate for induced stress of the first compartment 400 by the second compartment 402.

According to an embodiment of the invention, the first compartment 400 may comprise an area only slightly larger than the area occupied by the conduits 103, 103' and associated sensors, drivers, and interconnects. The relatively small volume of the first compartment 400 in relationship to the flowmeter components installed therein minimizes the risk that housing 200 ruptures in the event of a conduit 103, 103' failure. In an embodiment, the first compartment 400 is constructed such that the pressure rating of the first compartment 400 is equal to or greater than a pressure rating of the one or more conduits 103, 103'. As an example, without limitation, if the conduits 103, 103' are rated to handle 500 psi of fluid pressure, the first compartment would also be rated for 500 psi or greater of fluid pressure. In some embodiments, the first compartment 400 comprises a pressure rating that is a predetermined percentage of the pressure rating of the one or more conduits 103, 103'. Thus, as a non-limiting example, if the predetermined pressure rating of the first compartment 400 is 80% of conduit rating, and the conduits 103, 103' are rated to handle 500 psi, the first compartment 400 would be rated to accommodate a pressure of 400 psi, for example without limitation.

The housing 200 is typically made from a metal, such as steel, stainless steel, aluminum, magnesium, nickel, titanium, combinations thereof, or any other metal known in the art. However, in other embodiments, housings made at least partially from polymers, plastics, and composite materials containing carbon fiber or ballistic fabrics, for example, are contemplated. Additionally, in some embodiments, a metal housing 200 may be reinforced with polymers, plastics, and composite materials containing carbon fiber or ballistic fabrics, for example.

In an embodiment, the first compartment 400 defines an access opening 408. This opening 408 is a cutout of the housing 200 that provides the clearance and space necessary for the assembly of the flowmeter 5. In embodiments with curved conduits 103, 103' (or other conduit shapes that comprise bends) it may be difficult or even impossible to assemble the flowmeter 5 without an access opening 408, as the first compartment 400 may also follow the contours of the conduits 103, 103', and situations may arise where feeding the conduits 103, 103' through manifold openings 410, 410' is not physically possible. In another embodiment, the first compartment 400 is of a multi-part construction such that each part may be welded around the sensor assembly 10. The access opening 408 may be sealed with a cover 412 having a requisite shape and dimension to seal the access opening 408. In an embodiment, the cover 412 is welded to the access opening 408, however, other embodiments contemplate alternative means for sealing the cover 412 such that the first compartment 400 is fluid tight. In an embodiment, sealants and/or adhesives are contemplated. In another embodiment, mechanical fasteners are used. In an embodiment, the cover 412 is shaped such that it follows the contours of the first compartment 400. In an embodiment, the first compartment 400 is constructed from tube material, and the cover 412 is formed or machined from tube material. In another embodiment, the cover 412 is simply a plate of material. In an embodiment, a second compartment 402 of the housing 200 may be coupled to the first compartment 400. The first and second compartments 400, 402 may be coupled in multiple locations. The first and second compartments 400, 402 may alternatively be pre-assembled before the sensor assembly 10 is assembled into the first compartment 400.

In an embodiment, the manifolds 102, 102' are secured to the first compartment 400 proximate manifold openings 410, 410' in a manner that is fluid tight. In an embodiment, the manifolds are welded to the first compartment 400 proximate the manifold openings 410, 410'. The manifold openings 410, 410' are openings defined by the first compartment 400 that are a size and dimension to engage the manifolds 102, 102'.

The housing 200 can be coupled to the manifolds 102, 102', respectively. The manifolds 102, 102' may be coupled to the manifold openings 410, 410' of the housing 200 according to known methods including, but not limited to, adhesives, brazing, bonding, mechanical fasteners, etc. Because the manifolds 102, 102' are also coupled to the conduits 103, 103', vibrations of the housing 200 can be experienced by the conduits 103, 103' and interfere with the meter measurements.

While prior art housings are susceptible to vibrate in one or more vibrational modes due to an overlap between the drive mode and a resonant frequency of the housing, the housing 200 of the present invention is constructed in such a manner such that the resonant frequencies required to induce a mode of vibration are substantially reduced and separated away from the drive mode frequency. The second compartment 402 has at least one wall 404 therein. The wall defines voids 406 within the second compartment 402. The walls 404 may be welded in place to define fluid-tight voids 406. In an embodiment, the walls 404 may be machined, cast, or both cast and machined. By arranging the walls 404 in differing configurations, the frequency of the structure may be altered. For example, a flat plate of metal will have a different natural frequency than that same plate when it is stiffened by ribs. Therefore, by adding walls 404 to the interior of the second compartment 402, the housing 200 as a whole will have greater stiffness, mass, and damping than a comparable housing without such walls 404. According to an embodiment of the invention, the resonant frequencies of the housing 200 are substantially separated from the drive mode frequency by providing walls 404 formed with or installed in the second compartment 402 of the housing 200. Likewise, by selectively making particular walls 404 thicker than other walls 404, stiffness, mass, and damping of the housing 200 will change. Overall, the number, position, and thickness of walls are designed and placed in the second compartment 402 and/or the first compartment 400 so that the modal interaction with the drive mode is acceptable. Since the size, materials, and configuration of flowmeters 5 varies drastically, the number, position, and thickness of walls 404 will also vary accordingly. By making one wall 404 selectively thicker than the other walls 404, the inertia around an axis, or stiffness of a bending shape, can be designed to optimize the modes of vibration.

In the embodiment shown in FIG. 4, the housing 200 includes a plurality of walls 404. The walls 404 may be provided to strengthen the housing 200 while maintaining a reduced weight. For example, by increasing the number of walls 404 in the housing 200 and/or by decreasing the spacing between the walls 404, the rigidity of the housing 200 may increase, thereby increasing the damping of the housing 200 to further reduce the frequencies required to induce a mode of vibration in the housing 200.

According to an embodiment of the invention, the housing 200 is formed such that a frequency separation between a frequency that induces a mode of vibration in the housing 200 and the drive mode frequency is greater than 1 kHz. In another embodiment, the frequency separation is greater than 3-5 kHz, based on the anticipated fluid densities. In some embodiments, the housing 200 may be formed in order to maintain sufficient frequency separation for a range of fluid densities. For example, the resonant frequencies of the housing 200 may remain below the drive mode frequency even during multi-phase flow. In another embodiment, a predetermined threshold difference between modal frequencies of the housing and the driven mode frequency is effectuated. The degree of frequency separation can be adjusted based on the specific material used for the housing 200 and/or the specific thickness, placement, and general configuration of the walls 404, as well as by the addition of ballast to a void 406 (see following description). Additionally, coatings, films, foils, or other surface treatments may be applied to the housing 200. Furthermore, mechanical dampers, such as shock absorbers, for example without limitation, may be attached to the housing 200.

In an embodiment, a base 414 serves to define an outer boundary of the case 200, and of the second compartment 402 in particular. The walls 404 may be attached to the base 414. The walls, in an embodiment, may be attached to the base 414 and also a surface defining the first compartment 400.

Figure 5:
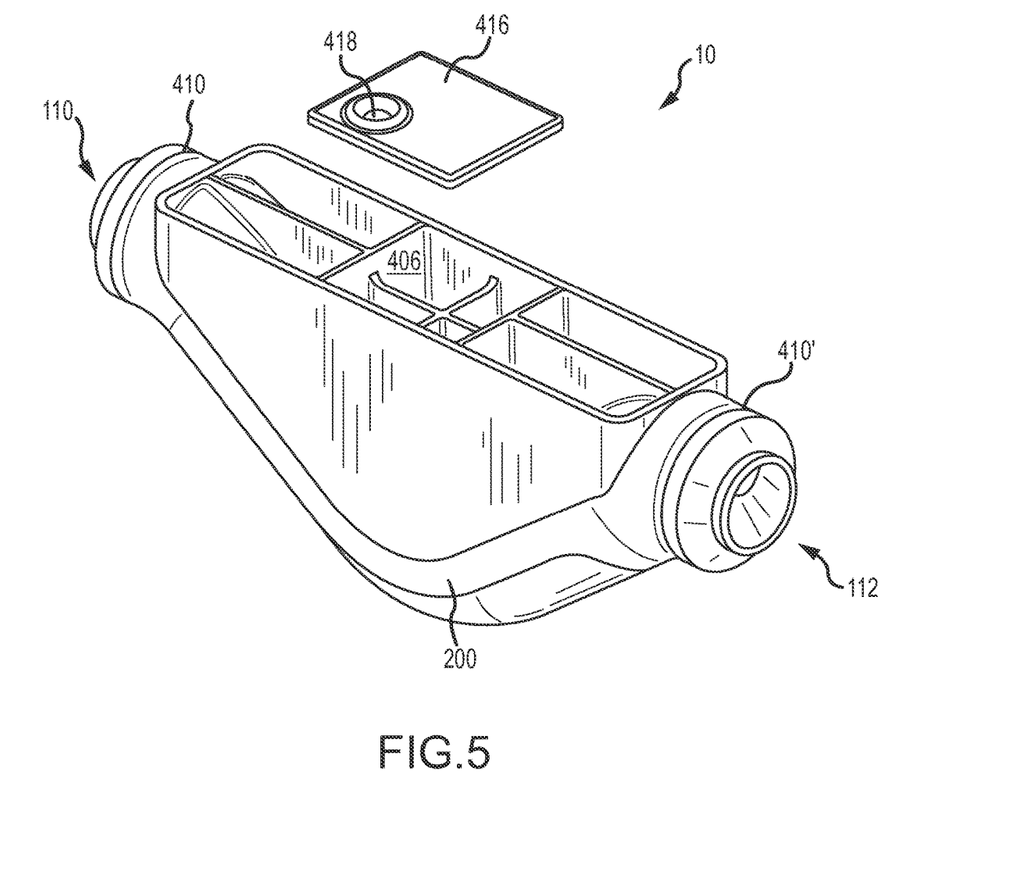
FIG. 5 illustrates a sensor assembly according to an embodiment.

FIG. 5 illustrates an alternate embodiment of a sensor assembly 10 having a housing 200. A cover plate 416 is configured to seal at least a portion of the second compartment 402. By attaching the cover plate 416 to the housing 200, including at least some of the walls 404 as attachment points, at least one of the voids 406 is effectively sealed. In an embodiment, the cover plate 416 is welded to the housing 200. The cover plate 416 may comprise a sealable fill port 418. As noted above, adding stiffness to the housing 200 with walls 404 may be used to optimize vibrational responses of the housing 200. Likewise, adding mass to the housing 200 is also a tool that can be employed to optimize the housing's 200 vibrational response. Unfortunately, heavy flowmeters 5 are costly to transport. An embodiment reduces the cost of transport by providing at least one void 406 that is fillable by the user. Ballast may be added to the void 406 through the fill port 418 after the meter has been transported to the site of use. The ballast may comprise any contemplated liquid, solid, or combination thereof. Some examples of ballast are, without limitation, water, sand, lead shot, potting, liquid casting masses, and other granular material. Additionally, solid material may be coated or otherwise combined with fluid such as liquid casting masses. In an embodiment, the ballast comprises a pressurized fluid. Besides being less costly to transport, each flowmeter 5 is also customizable, such that precisely the desired type and mass of ballast may be utilized as dictated by application-specific circumstances. Once ballast is added to a void 406 through the fill port 418, the fill port 418 may be sealed. The fill port 418 may comprise a re-sealable closure, such as plug or fastener, or may be welded or adhered in place to make a permanent or semi-permanent closure. As a result, the flowmeter 5 is not faced with the vibration overlap that typically plagues prior art meters. It should be noted that a fill port 418 may, in an embodiment, be present in the base 414.

Figure 6:
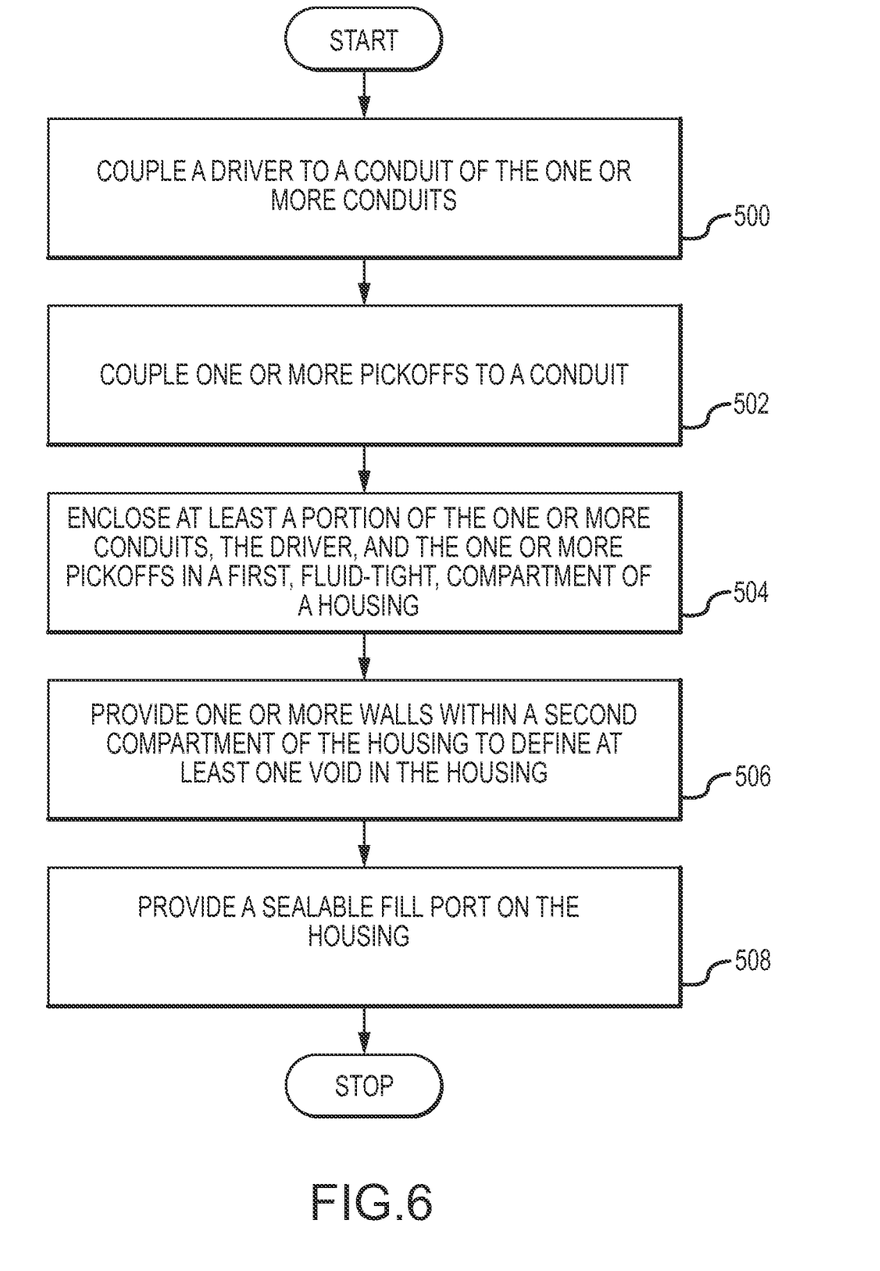
FIG. 6 illustrates a flow chart describing a method of forming a flowmeter according to an embodiment.

Turning to FIG. 6, a method of forming a flowmeter 5 is provided. In step 500, a driver 104 is coupled to a conduit of the one or more conduits 103, 103', and the driver 104 is configured to vibrate at least a portion of the conduit at one or more drive frequencies. This driver 104 may comprise any one of many well-known arrangements, such as a magnet mounted to conduit 103 and a coil mounted to an opposing conduit 103', through which an alternating current is passed for vibrating both conduits 103, 103'. One or more pickoffs 105, 105' are coupled to a conduit of the one or more conduits 103, 103', the one or more pickoffs 105, 105' being configured to detect a motion of the vibrating portion of the conduit, as shown in step 502. The one or more pickoffs 105, 105' are magnet/coil pickoffs, strain gages, optical sensors, or any other pickoff known in the art. In step 504, at least a portion of the one or more conduits 103, 103', the driver 104, and the one or more pickoffs 105, 105' are enclosed in a first compartment 400 of a housing 200 having both a first compartment 400 and a second compartment 402, wherein the first compartment 400 is fluid-tight. In an embodiment, the one or more manifolds 102, 102' are coupled to the one or more conduits 103, 103', wherein one or more manifold openings 410, 410' are defined by the first compartment 400. The manifold openings 410, 410' are adapted to receive the one or more manifolds 102, 102'. This allows the sealed joining of the manifolds 102, 102' to the manifold openings 410, 410', which allows for a fluid-tight assembly. Therefore, should a conduit 103, 103' rupture, process fluid may be contained in the first compartment 400, thus containing the process fluid within the case.

In an embodiment, the first compartment 400 has a pressure rating equal to or greater than a pressure rating of the one or more conduits 103, 103'. In a similar embodiment, the first compartment 400 has a pressure rating that is a predetermined percentage of the pressure rating of the one or more conduits 103, 103'.

In step 506, one or more walls 404 within the second compartment 402 are provided to define at least one void 406 in the housing 200. The void 406 may be sealable in an embodiment. In a related embodiment, the method of forming a flowmeter 5 includes the step of sealing at least one void 406 with a cover plate 416. In a related method, ballast material is provided in the void 406. As noted above, the ballast may comprise any contemplated liquid, solid, or combination thereof. Some examples of ballast include, without limitation, water, sand, lead shot, potting, liquid casting masses, and other granular material. Additionally, solid material may be coated or otherwise combined with liquid such as liquid casting masses.

A sealable fill port 418 is provided on the flowmeter housing 200 in step 508. The fill port 418 provides access to a void 406 so that ballast may be added therein. In a related embodiment, an access opening 408 may be provided. In another embodiment, the access opening 408 is sealed with a cover 412 having a requisite shape and dimension to seal the access opening 408. In an embodiment, the cover 412 is welded to the access opening 408, however, other embodiments contemplate alternative means for sealing the cover 412 such that the first compartment is fluid tight.

In yet another related method, the walls 404 in the housing 200 are oriented such that modal frequencies of the housing 200 differ from a driven mode frequency by a predetermined threshold. One way in which the modal frequencies of the housing 200 are tuned, for example, is by including one or more walls 404 that is/are thicker than other walls of the housing 200.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

We claim:

1. A flowmeter (5), comprising:
 one or more conduits (103, 103');
 a driver (104) coupled to a conduit of the one or more conduits (103, 103') and configured to vibrate at least a portion of the conduit at one or more drive frequencies;
 one or more pickoffs (105, 105') coupled to a conduit of the one or more conduits (103, 103') and configured to detect a motion of the conduit;

a housing (200) having a first compartment (400) and a second compartment (402), wherein the first compartment (400) is configurable to be fluid-tight and encloses at least a portion of the one or more conduits (103, 103'), the driver (104), and the one or more pickoffs (105, 105'); and a sealable fill port (418) configured to allow the addition of a ballast material to the second compartment (402).

2. The flowmeter (5) of claim 1, comprising one or more walls (404) in the second compartment (402) defining at least two voids (406) in the second compartment (402).

3. The flowmeter (5) of claim 2, wherein the one or more walls (404) are coupled to the housing (200) and to a base (414) that defines at least a portion of the second compartment (402).

4. The flowmeter (5) of claim 1, wherein the second compartment (402) comprises a cover plate (416) configured to seal at least one void (406) in the housing.

5. The flowmeter (5) of claim 4, wherein the cover plate (416) defines the sealable fill port (418).

6. The flowmeter (5) of claim 4, wherein the cover plate (416) is welded to the housing (200).

7. The flowmeter (5) of claim 1, comprising one or more manifolds (102, 102') coupled to the one or more conduits (103, 103') and one or more manifold openings (410, 410') formed in the first compartment (400) and adapted to receive the one or more manifolds (102, 102'), wherein the one or more manifolds (102, 102') are sealedly joined to the one or more manifold openings (410, 410').

8. The flowmeter (5) of claim 1, wherein a first wall of the one or more walls (404) is thicker than a second wall of the one or more walls (404).

9. The flowmeter (5) of claim 1, wherein at least one void (406) contains a ballast material.

10. The flowmeter (5) of claim 1, comprising:
an access opening (408) configured to permit assembly of the flowmeter (5); and
a cover (412) configured to seal the access opening (408).

11. A method of forming a flowmeter including one or more conduits, comprising the steps of:
enclosing at least a portion of the one or more conduits in a first compartment of a housing comprising a first compartment and a second compartment, wherein the first compartment is fluid-tight; and
providing a sealable fill port configured to allow the addition of a ballast material to the second compartment.

12. The method of claim 11, comprising the step of providing one or more walls within the second compartment to define at least two voids in the second compartment.

13. The method of claim 11, comprising the step of sealing at least one void with a cover plate.

14. The method of claim 11, comprising the step of providing a ballast material in at least one void.

15. The method of claim 11, wherein the first compartment comprises a pressure rating equal to or greater than a pressure rating of the one or more conduits.

16. The method of claim 11, wherein the first compartment comprises a pressure rating that is a predetermined percentage of the pressure rating of the one or more conduits.

17. The method of claim 11, comprising the steps of:
coupling one or more manifolds to the one or more conduits;
forming one or more manifold openings in the first compartment, wherein the one or more manifold openings are adapted to receive the one or more manifolds; and
sealedly joining the one or more manifolds to the one or more manifold openings.

18. The method of claim 11, wherein a first wall of the one or more walls is thicker than a second wall of the one or more walls.

19. The method of claim 11, comprising the step of orienting at least one of the one or more walls in the housing so that modal frequencies of the housing differ from a driven modal frequency by a predetermined threshold.

20. The method of claim 11, comprising the step of providing an access opening in the first compartment to permit assembly of the flowmeter.

21. A housing (200), comprising:
a first compartment (400);
a second compartment (402), wherein the first compartment (400) is configured to be fluid-tight and configured to enclose at least a portion of a sensor assembly (10); and
a sealable fill port (418) configured to allow the addition of a ballast material to the second compartment (402).

22. The housing (200) of claim 21, comprising one or more walls (404) in the second compartment (402) defining at least two voids (406) in the second compartment (402).

23. The housing (200) of claim 22, wherein the one or more walls (404) are coupled to the housing (200) and to a base (414) that defines at least a portion of the second compartment (402).

24. The housing (200) of claim 21, wherein the second compartment (402) comprises a cover plate (416) configured to seal at least one void (406) in the housing (200).

25. The housing (200) of claim 24, wherein the cover plate (416) defines the sealable fill port (418).

26. The housing (200) of claim 24, wherein the cover plate (416) is welded to the housing (200).

27. The housing (200) of claim 21, configured to sealedly couple one or more manifolds (102, 102') to one or more manifold openings (410, 410') formed in the first compartment (400).

28. The housing (200) of claim 21, wherein a first wall of the one or more walls (404) is thicker than a second wall of the one or more walls (404).

29. The housing (200) of claim 21, wherein at least one void (406) contains a ballast material.

30. The housing (200) of claim 21, comprising:
an access opening (408); and
a cover (412) configured to seal the access opening (408).

31. A method of forming a housing, comprising the steps of:
providing a first compartment and a second compartment in the housing, wherein the first compartment is configured to encase at least a portion of a sensor assembly and is fluid-tight; and
providing a sealable fill port configured to allow the addition of a ballast material to the second compartment.

32. The method of claim 31, comprising the step of providing one or more walls within the second compartment to define at least two voids in the second compartment.

33. The method of claim 31, comprising the step of sealing at least one void with a cover plate.

34. The method of claim 31, comprising the step of providing a ballast material in at least one void.

35. The method of claim 31, wherein the first compartment comprises a pressure rating equal to or greater than a pressure rating of a conduit of the sensor assembly.

36. The method of claim 31, wherein the first compartment comprises a pressure rating that is a predetermined percentage of a pressure rating of a conduit of the sensor assembly.

37. The method of claim 31, comprising the steps of:
   forming one or more manifold openings in the first compartment, wherein the one or more manifold openings are adapted to receive and sealedly join the first compartment to one or more manifolds.

38. The method of claim 31, wherein a first wall of the one or more walls is thicker than a second wall of the one or more walls.

39. The method of claim 31, comprising the step of providing at least one of the one or more walls in the housing so that modal frequencies of the housing differ from a driven modal frequency by a predetermined threshold.

40. The method of claim 31, comprising the step of providing an access opening in the first compartment.

\* \* \* \* \*